Figure 1:
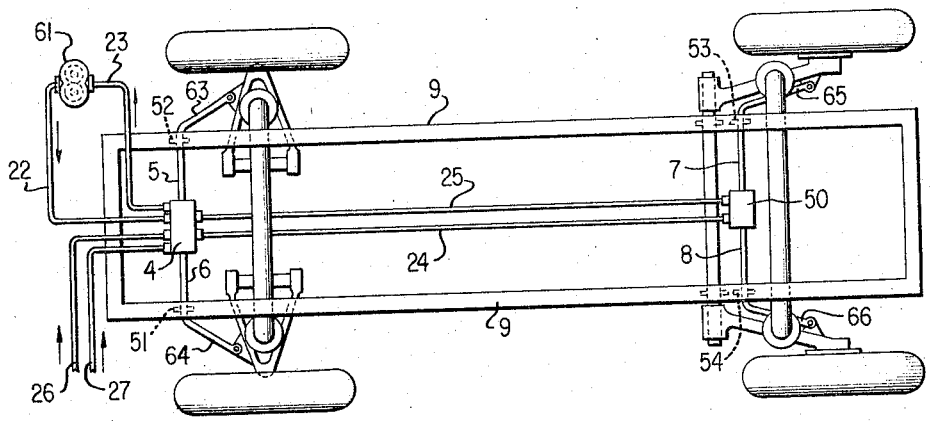

Jan. 24, 1967  F. H. VAN WINSEN ETAL  3,300,232
CURVE STABILIZATION OF MOTOR VEHICLES
Filed Sept. 8, 1964

INVENTORS.
FRIEDRICH H. VAN WINSEN
KLAUS BAUER
BY
Dicke & Craig
ATTORNEYS.

United States Patent Office 3,300,232
Patented Jan. 24, 1967

3,300,232
CURVE STABILIZATION OF MOTOR VEHICLES
Friedrich H. Van Winsen, Kirchheim (Teck), and Klaus Bauer, Stuttgart-Unterturkheim, Germany, assignors to Daimler-Benz Aktiengesellschaft, Stuttgart-Unterturkheim, Germany
Filed Sept. 8, 1964, Ser. No. 394,801
4 Claims. (Cl. 280—112)

The present invention relates to a system for the curve stabilization of the vehicle body in motor vehicles, in which the wheel carriers of each axle are coupled with one another by an interrupted torsion rod stabilizer whose two parts are connected with one another by a hydraulic adjusting motor, in which additionally the torsion rod ends are adapted to be rotated or twisted with respect to one another by the working fluid by means of the adjusting motor in case of a tilting of the vehicle body, and in which the working fluid is controlled by a hydraulic control circuit influenced by centrifugal forces as shown and described in German Patent 1,105,290.

Whereas in the aforementioned German patent the adjustment of the torsion rod stabilizers are already disclosed as such as well as the specific means therefor, the present invention is concerned with the coordination of the forward adjusting motor to the rear adjusting motor, in case a torsion rod stabilizer is installed both at the front axle as well as also at the rear axle.

The aim of the present invention is to so control the operation of the adjusting motors at the forward axle and at the rear axle that the turning or tilting movement of the frame brought about by the adjusting motors acts in opposition to the tilting of the vehicle body produced by the centrifugal force and that always a predetermined ratio exists between the torsion moment at the forward stabilizer, produced by relative rotation or twisting of the rectilinear torsion rod parts extending out of the adjusting motor, with respect to the torsion moment at the rear stabilizer. As a result thereof, the couples, which are produced by the support of the U-shaped stabilizer ends on the vehicle wheels and which effect the tilting or turning of the frame, are also at a constant ratio.

The underlying problems are solved in accordance with the present invention with an arrangement as disclosed in the aforementioned German patent in that the control slide member actuated by the control fluid controls in accordance with a right-hand or left-hand curve the inlet or discharge of the working fluid into or out of the chambers of the adjusting motors and the mutually corresponding chambers of the forward and rear adjusting motors are connected with one another by appropriate lines.

It is known in the prior art to control a working fluid by means of a slide valve in accordance with curve drive and to connect the adjusting motors of both axles with each other by lines. However, the known prior art arrangement lacks a control fluid circulatory system additional to the working fluid circulatory system, instead the latter is controlled directly by the inertia pendulum or by the steering system. Consequently, with the aforementioned prior art installations the space for the control valve cannot be selected completely freely since the pendulum or the connection to the steering linkage requires a certain volume that is not present or available in general within the wheel suspensions normally affording very limited space. This prior art arrangement also provides no suggestion for an indirect actuation of the control valve by a control circuit. A separate control circuit additionally provides in a simple manner the possibility to coordinate to each pendulum deflection or to each cross tilting force a certain control pressure.

By reason of the connecting line system of the chambers of the forward and rearward adjusting motors the same fluid pressure prevails in both motors. This results in a constant ratio of the force couple exerted by the forward torsion rod on the frame with respect to the force couple exerted by the rear torsion rod on the frame. By reason of this constant ratio the inherent steering characteristics and steering behavior of the motor vehicle will not be changed when driving through curves, be it oversteering, neutral, or under-steering. As known in the prior art, it is possible to influence this inherent steering behavior by a corresponding wheel load distribution which is to take place with such prior art systems only in the sense of a maintenance of the once selected tendency. How large this constant ratio of the force couples will be selected depends on the mass distribution of the respective vehicle, that is, in what proportion the centrifugal force moment is distributed to the front and rear vehicle axle.

The desired ratio of the force couples is achieved in an advantageous manner in that the effective piston surfaces of the forward adjusting motor is at the predetermined ratio to that of the rear motor. It is further proposed in accordance with the present invention that the control slide valve as well as the inlet of the control fluid as well as also the inlet and discharge of the working fluid are arranged only in one adjusting motor.

Accordingly, it is an object of the present invention to provide a curve stabilization system for the vehicle body of motor vehicles which is simple in construction yet effectively eliminates the aforementioned disadvantages and drawbacks encountered with the prior art constructions.

Another object of the present invention resides in the provision of a curve stabilization system for motor vehicles in which a counter force is produced seeking to counteract the tilting of the body caused by centrifugal forces while maintaining at all times a predetermined ratio in the adjusting forces produced at the front and rear axles.

Another object of the present invention resides in the provision of a stabilization system that utilizes a working circuit as well as a separate control circuit controlling the working fluid circuit, thereby increasing the versatility of the system.

Still another object of the present invention resides in the provision of a curve stabilization system which permits the ready accommodation of the component parts even under crowded conditions such as exist in vehicle wheel suspensions.

Another object of the present invention resides in the provision of a curve stabilization of the type described above which permits an accurate, and predetermined control of a varying control pressure in dependence on the tilting force acting on the body when driving through curves.

Still another object of the present invention resides in the provision of a curve stabilization system for motor vehicles utilizing two interrupted torsion rod elements for bringing about the desired stabilization in which the force couple exerted on the frame by the forward torsion rod elements remains at a constant ratio to the force couple of the rear torsion rod elements.

Still a further object of the present invention resides in the provision of a curve stabilization system achieving all of the aforementioned objects and advantages while at the same time maintaining the inherent steering characteristics of the vehicle without affecting the same when bringing the curve stabilization into play.

Figure 2:
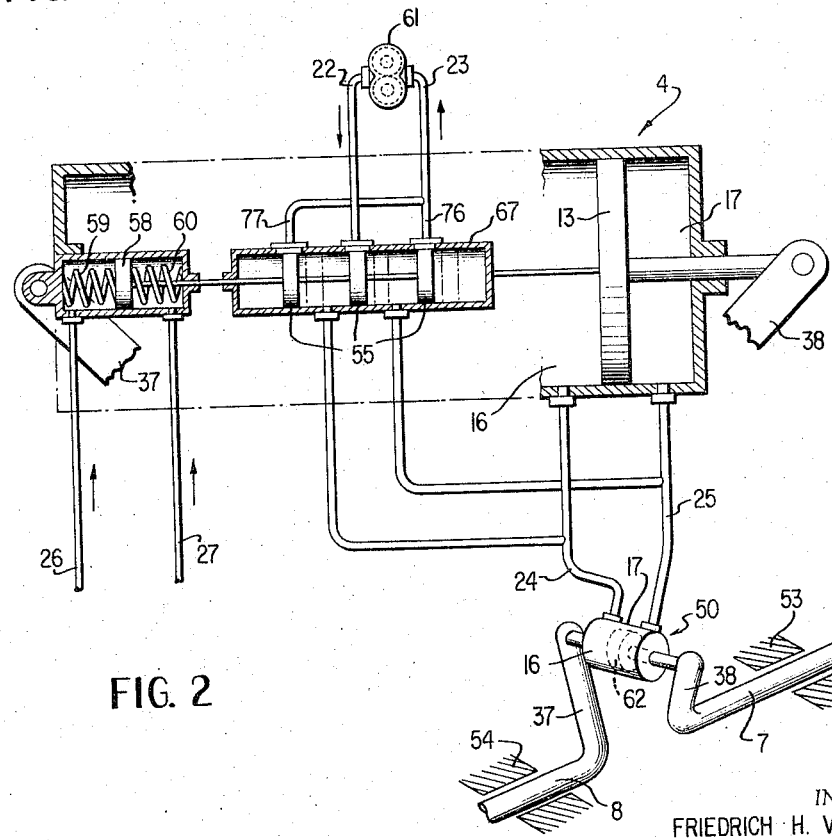

These and other objects, features and advantages of the present invention will become more obvious from the following description when taken in connection with the accompanying drawing which shows, for purposes of illustration only, one embodiment in accordance with the present invention, and wherein FIGURE 1 is a schematic plan view of a curve stabilization arrangement in accordance with the present invention in a motor vehicle provided with a hydraulic connection of the adjusting motors according to the present invention, and FIGURE 2 is a partial somewhat schematic view illustrating certain details of the adjusting motors provided with a control circuit and with a working circuit in accordance with the present invention, with some of the parts shown in partial cross section.

Refering now to the drawing wherein like reference numerals are used throughout the two views to designate like parts, the same reference numerals being also used again in this case as in the aforementioned German patent, reference numerals 4 and 50 designate in FIGURE 1 the adjusting motors which include conventional rotary pistons. Each adjusting motor 4 and 50 adjusts the interrupted ends of a respective torsion rod stabilizer whereby the parts 5 and 6 represent the interrupted parts of the forward torsion rod stabilizer cooperating with the adjusting motor 4 while the parts 7 and 8 represent the interrupted parts of the rear torsion rod stabilizer cooperating with the rear adjusting motor 50. The parts 5 and 6 and the parts 7 and 8 are operatively connected with the rotary piston and with the housing of a respective adjusting motor for rotation in unison therewith as is disclosed in the said German patent. FIGURE 2 illustrates a modified embodiment of the said German patent, according to which the adjusting motors 4 and 50 have a rectilinear piston movement. The inner ends 37 and 38 of the torsion rod parts 5 and 6 and of the torsion rod parts 7 and 8 are thereby angularly bent and are connected with the piston 13 and with the cylinder of the corresponding adjusting motor, respectively. The torsion rod parts 5 to 8 of the forward and of the rear torsion rod stabilizer are freely rotatably supported at the frame 9 in bearing places 51 to 54, by any conventional means. The outer ends 63 to 66 of the torsion rod parts 5 to 8 which are also angularly bent are appropriately connected with the wheel suspensions of the respective vehicle wheels.

The installation illustrated herein operates with a control circulatory system responding to a signal for the initiation of the stabilizing action. The control circuit actuates a control valve having a spool-type control slide valve member 55 by means of which the working fluid may be selectively supplied to the two adjusting motors 4 and 50. The control valve common to both adjusting motors 4 and 50 is combined in FIGURE 2 with the forward adjusting motor generally designated by reference numeral 4 in this figure. The supply of the control fluid for the adjustment of the control slide member 55 takes place in case of a drive through a right-hand curve by way of line 26 and in case of a drive through a left-hand curve by way of line 27 into the forward adjusting motor 4. The control fluid actuates a piston 58 movable in a housing connected with the cylinder of the adjusting motor 4. The piston 58 adjusts the control slide member 55 corresponding to the pressure of the control fluid against the force of springs 59 or 60. The control housing 67 for the control slide member 55 is movable within the adjusting motor 4 and is taken along by the piston 13 with which it is rigidly connected. The supply and discharge of the working fluid for the adjustment of the torsion rod parts 5 to 8 takes place by way of lines 22 and 23, respectively, within the forward adjusting motor 4. In the center position of the control slide member 55 the working fluid is continuously supplied without pressure by a gear pump 61 into a circulatory circuit. The respective chambers 16 and 17 of the two adjusting motors 4 and 50 are connected with each other by lines 24 and 25. The effective piston surface of the piston 13 is larger than that of the piston 62 within the adjusting motor 50. As a result thereof, the force couple acting at the forward bearing places 51 and 52 is larger in the ratio of these piston surfaces than the force couple acting at the rear bearing in places 53 and 54 with the same lever arm length of the arms 63 to 66. This force ratio may be achieved also by different lever arm lengths of the U-shaped angularly bent torsion rods at the forward and rear stabilizer and/or by a combination of both such possibilities.

*Operation*

The operation of the control circuit and of the working circuit will now be explained by reference to FIGURE 2 with a right hand curve through which the vehicle drives:

The control fluid flows through line 26 and acts on the piston 58 against the force of spring 60. The control slide member 55 is displaced toward the right into a predetermined position dependent on the control pressure, for example, into the position thereof shown in dash lines. The working fluid for the adjustment of the torsion rod parts flows from line 22 by way of the path opened up by the control slide member 55 through the line 24 into the chambers 16 of the adjusting motors 4 and 50. The chambers 17 of the adjusting motors 4 and 50 are connected by way of lines 25 and the control valve with the discharge line 23. The piston 13 as well as the piston 62 in the adjusting motors 4 and 50 are thereby displaced toward the right by the working fluid to such an extent until the control housing 67 of the control valve secured to the piston 13 is so disposed in relation to the control slide member 55 that a throttling of the pressure of the working fluid takes place by way of the discharge lines 76 and 77, and a predetermined pressure is adjusted in the line 24 and therewith in the chambers 16 as well as in control housing 67 which pressure is dependent on the pressure of the control fluid. When driving through a left hand curve, a corresponding adjustment of the piston 58, of the control slide member 55 and of the pistons 13 and 62 toward the left takes place.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

We claim:

1. A curve stabilization system for the vehicle body of the motor vehicle, having front and rear axles with wheel suspension means and in which respective wheel suspension means are operatively coupled with each other by interrupted torsion rod stabilizer means, comprising:

torsion rod stabilizer means for each axle including two interrupted torsion rod stabilizer parts connected at the outer ends thereof with a respective wheel suspension means, and forward and rear hydraulic adjusting motor means each operatively connecting with each other the inner ends of the two parts of a respective interrupted torsion rod stabilizer means, said forward and rear adjusting motor means each having a piston defining chambers receiving working fluid, working circuit means for selectively supplying to and discharging from said chambers working fluid to actuate said piston and twist the inner ends of the two parts of a respective torsion rod stabilizer means relative to one another so as to oppose the tilting of the vehicle body, and control circuit means for controlling the selective supply and discharge of working fluid to and from said chambers including control slide valve means operatively interconnected into said working circuit means for control thereof including a chamber member and a valve slide member in said chamber, and hydraulic means responsive to the drive of the vehicle through a curve connected to one of said members of said control slide valve means for selectively actuating said control slide valve means to selectively valve the supply and discharge of the working fluid to and from said chambers of the adjusting motor means in dependence on the drive of the vehicle through a right or left hand curve, the other of said members of said control slide valve means being connected to one of said pistons, and said hydraulic means and said control slide valve means being positioned within one of the chambers of one of said adjusting motor means, and said working circuit means including line means operatively connecting with each other the corresponding chambers of the forward and rear adjusting motor means.

2. A curve stabilization system as defined in claim 1 wherein said control slide means and hydraulic means are arranged in only one of said adjusting motor means, said hydraulic means including a hydraulically actuated control piston connected to the valve slide member of said control slide valve means.

3. The device of claim 1, wherein the effective surface of one of said pistons is substantially larger than the effective surface of the other of said pistons.

4. The device of claim 1, wherein said hydraulic means is directly connected to said valve slide member and said chamber member of said control slide valve means being directly connected to said one piston.

References Cited by the Examiner

UNITED STATES PATENTS

| | | |
|---|---|---|
| 1,990,517 | 2/1935 | Bedford. |
| 2,387,249 | 10/1945 | Eddington _____ 280—6.1 X |
| 2,802,674 | 8/1957 | Jackson _____ 280—111 |
| 2,872,200 | 2/1959 | Kroll _____ 280—112 X |
| 3,194,581 | 7/1965 | Brueder _____ 280—6 X |
| 3,197,233 | 7/1965 | Van Winsen _____ 280—112 |

FOREIGN PATENTS

| | | |
|---|---|---|
| 1,309,058 | 10/1962 | France. |
| 895,095 | 5/1962 | Great Britain. |

BENJAMIN HERSH, *Primary Examiner.*

W. A. MARCONTELL, M. S. SALES,
*Assistant Examiners.*